Patented Sept. 15, 1936

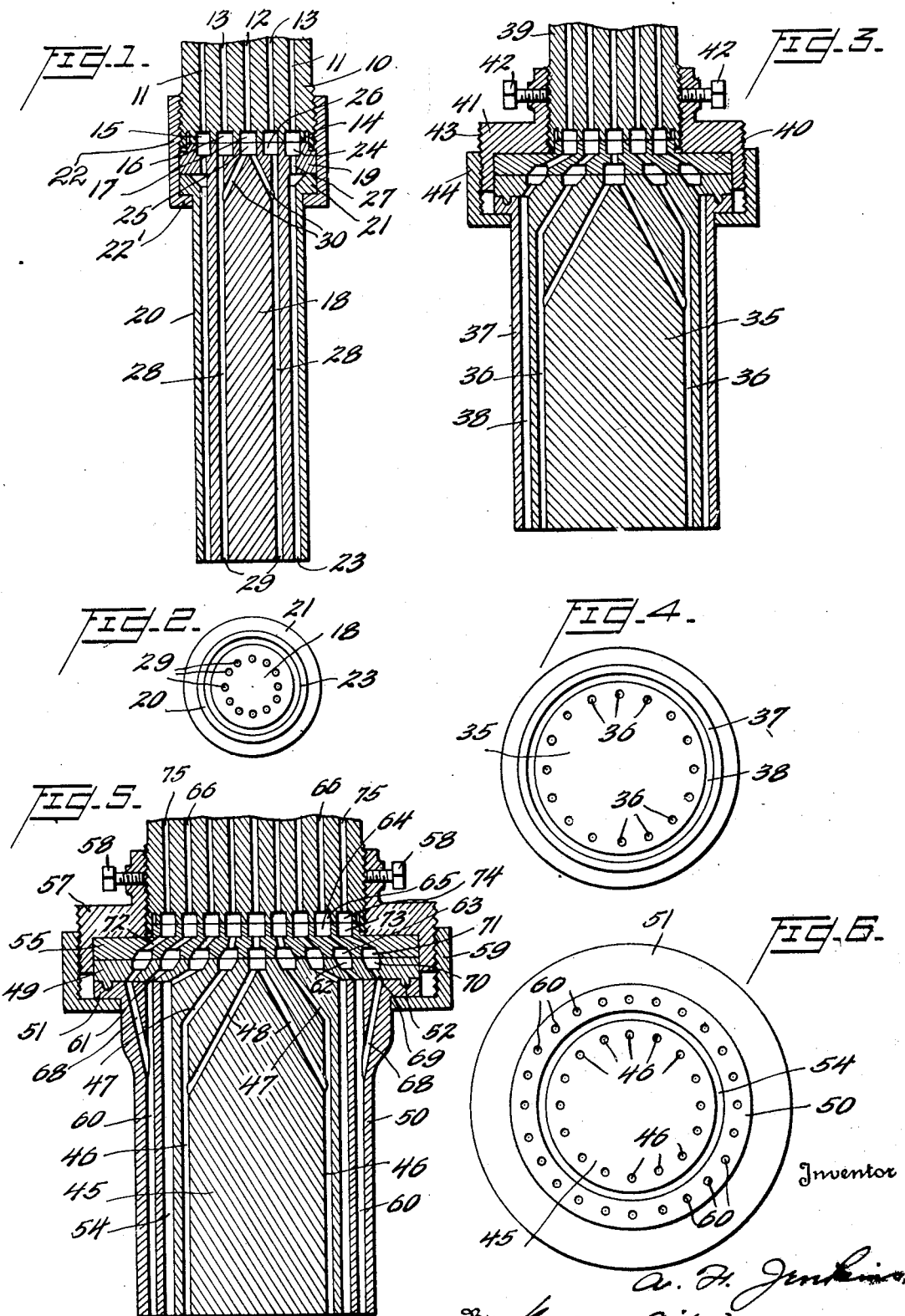

2,054,601

UNITED STATES PATENT OFFICE 2,054,601

TIP FOR OXY-ACETYLENE TORCHES

Alexander F. Jenkins, Baltimore, Md.

Application July 21, 1934, Serial No. 736,409

8 Claims. (Cl. 158—27.4)

This invention relates to tips for oxy-acetylene torches and particularly to tips employed for cutting purposes.

This application is a continuation in part of the applicant's copending application Serial No. 534,416, filed May 1, 1931.

In accordance with the invention, a novel form of cutting tip is provided whereby sheets, plates, and the like may have slots cut therethrough quickly and at small expense. In its preferred form, the present invention contemplates the provision of means for cutting annular slots; in other words, it aims to provide a tip for "punching" circular holes in metallic members by burning away the metal of such members along the periphery of a circle, thus severing a circular disk-like portion of the sheet or plate from the remainder thereof, and without moving the torch along the surface of the work.

By means of a tip designed and constructed in accordance with the present invention, it is possible to form a large circular aperture in a plate without burning away any great weight of metal, such as has been necessary in the case of prior tips in which the heating and cutting jets together formed a "solid" flame. Thus the cutting operation is materially shortened and the expenditure of oxygen is greatly minimized.

The tips may be of various diameters and in fact may be designed to cut very small apertures from plates or very large apertures resembling port holes for ships and the like. Preferably the tips are so formed that they may be affixed to the heads of standard cutting torches, and, where the tip is proportioned so that it has a capacity for cutting a hole of large diameter in a sheet or plate, a special adapter may be employed by means of which it can nevertheless be affixed to the head of a standard cutting torch.

The improved tip may have various forms, and in the accompanying drawing three embodiments are illustrated by way of example, one of the tips shown being of a relatively small diameter and the other two of considerably larger size. In the larger tips, means may be interposed between the tips and the torch heads for properly transmitting the gases from the head to the gas passages of the tip, and in some cases such adapting means may accommodate the use of the larger size tips to torch heads of standard dimensions.

In the drawing:

Figure 1 is an axial section through a portion of the head of a torch provided with passages for oxygen and heating gases, to which one of the improved tips has been applied;

Figure 2 is an end view of the tip, looking at the gas discharge end;

Figure 3 is a section through the head of a torch similar to that shown in Figure 1 but showing a tip of larger diameter applied thereto, together with means for transmitting the gas from the discharge ports of the head to the gas passages of the tip;

Figure 4 is an end view of the tip, looking at the discharge end thereof;

Figure 5 is a sectional view similar to Figures 1 and 3 illustrating a third form of torch tip and its associated head, in which there are provided means for projecting a heating flame upon either or both sides of the cutting oxygen jet; and Figure 6 is an end view of the tip illustrated in Figure 5.

In the form of the invention shown in Figure 1, a portion of the head of a torch is indicated at 10, this head having outer passages 11 for oxygen, a central passage 12 for oxygen, and intermediate passages 13 for combustible gases such as hydrogen or acetylene. The head is provided with a flat annular seating surface 14, and the gas passages discharge respectively into enlarged ports formed in these seating surfaces, oxygen passages 11 discharging into an annular discharge port or groove 15, the heating gas passages 13 discharging into an annular groove 16, and the oxygen passage 12 discharging into an enlarged circular port 17.

The tip comprises two members, an inner member of substantially cylindrical shape, indicated at 18 and having an integral flange 19 at its rear end, and an outer member 20 which encircles or envelops the inner member 18, this outer member having a flange 21 at its rear end which overlies the flange 19 of the inner member and is of substantially the same diameter. A coupling 22 having threaded engagement with the head 10 constitutes a means for firmly retaining both portions of the tip to the head, an inturned flange 22' of this coupling bearing upon flange 21 of the outer portion of the tip and clamping both flanges 19 and 21 firmly to the head.

The outer surface of the inner portion 18 of the tip is cylindrical, and the inner surface of the outer portion 20 of the tip is likewise cylindrical and uniformly spaced from the opposed cylindrical surface of member 18, thus defining between the two members a relatively large gas passage which is annular in cross section and which has an annular mouth or discharge port indicated at 23. The rear end of member 18 is flat, comprising a seating surface which seats against the surface 14 of the head, but this surface is provided with grooves which register with the several gas discharge ports of the head and constitute inlet ports for the gases passing from the head to the tip.

Thus the oxygen discharge groove 15 of the head is in register with an oxygen inlet groove 24 of the tip, the oxygen port 17 of the head is in register with the oxygen inlet port 25 of the tip, and the annular heating gas discharge port 16 of the head is in register with the similarly formed inlet port or groove 26 of the tip. From groove 24 a number of short passages 27 extend forwardly of the tip and bring this groove into communication with the annular oxygen passage between the members 18 and 20. From groove 26 a series of passageways 28 extend forwardly through the central member 18 of the tip, passages 28 having discharge ports 29 arranged in a circular series, as can be seen from Figure 2 of the drawing. From port 25 of the tip, a plurality of inclined passages 30 extend forwardly of the tip, each of these passages intersecting one of the passages 28.

The oxygen passing through passageways 30 meets the acetylene or other combustible gas passing through passageways 28 at these points of intersection, and mixing of these gases occurs from that point forward. The discharge ports 29 of the heating gas passages are disposed in close relationship to the discharge port 23 of the annular oxygen passage so that the heating flames of the tip impinge upon the work in close proximity to the annular stream of discharging oxygen. The function of the heating gas jets, of course, is to first bring the work up to the necessary temperature to permit the cutting jet to function properly.

By means of the tip described, it is possible to cut small disks from sheets quickly and conveniently and with small expenditure of gas and oxygen, and to cut narrow circular slots clear through the sheet so that a circular disk of metal is removed. A relatively large aperture is therefore formed with a minimum amount of labor, in a minimum time, and with a minimum expenditure of gas.

In the form of the invention shown in Figures 3 and 4, a tip of larger diameter is employed for forming still larger apertures in a sheet or plate. The tip comprises two portions as before, an inner portion 35 having heating gas passages 36, and an outer portion 37, the mutually facing surfaces of the inner and outer portions of the tip being spaced apart and cylindrical, thereby defining between them an oxygen passagway 38 annular in cross section and having an annular discharge port. The head 39 of the torch is the same as before in dimension and in arrangement of gas passages, seating surface, gas discharge ports, etc.

Inasmuch as the tip in this embodiment is of materially larger diameter than the head, it is necessary to interpose, between the head and tip, a circular disk-like member 40 which may be designated an adapter, this member 40 being provided on one side with grooves which register with the grooves formed in the seating surface of the head, and on the other side with grooves which register with the grooves formed in the seating surface of the tip, as may be clearly seen from an inspection of Figure 3. Suitable gas passages connect the oppositely facing grooves of the adapter and serve to transmit the gases along inclined paths from the discharge ports of the head to the gas inlet ports or grooves of the tip. Because of the large diameter of the tip and the adapter, a special fitting 41 is secured on the head, being preferably provided with threads which engage the external threads of the head and with locking set screws 42 to prevent rotation of the fitting on the head. This fitting is provided with an enlarged cylindrical portion exteriorly threaded at 43, and a special coupling 44 has threaded engagement with the fitting and serves to clamp the two portions of the tip and also the adapter firmly to the head.

By means of a tip of this character, a disk of relatively great diameter may be cut from a plate. In the event that it is desired to remove from a plate or sheet disks of still larger diameter, the diameter of the tip may be increased as desired. It is desirable to maintain the heating gas passages 36 at all times in close proximity to the annular oxygen passage 38, regardless of the diameter of the tip, in order that the maximum efficiency of the heating gases will be realized.

In some cases it may be desirable to project the heating flame exteriorly of the oxygen or cutting jet instead of interiorly thereof as in the embodiments already described. Furthermore, it may be found desirable to provide a heating flame on both sides of the cutting oxygen jet. Consequently, there is also provided by means of the present invention a third modification, illustrated for example in Figures 5 and 6 of the drawing. In this embodiment the inner member 45 is provided with an annular series of heating gas passageways 46 arranged near its periphery. The acetylene, hydrogen, or other combustible fluid is fed to these passageways through the ducts 47, and the oxygen flows through the ducts 48, the two fluids being mixed in the passageways 46 in a manner similar to that described in connection with the other embodiments. The inner member 45 is provided with a base flange 49 against which the inner end of the outer tip member 50 is adapted to abut. The outer member 50 is provided with a flange 51 and is centered by the cooperating means 52, which may be a tongue and groove connection or a mortise and tenon. The annular space 54 between the inner and outer members 45 and 50 provides a discharge port for the cutting oxygen similar to the discharge ports 29 of the first embodiment.

As thus far described, the tip is very similar to the second embodiment illustrated in Figures 3 and 4 and is provided with an adapter plate or disk 55 through which communication is had with the head passageways for supplying oxygen and combustible gas to the tip. The torch tip and its adapter plate are secured to the torch head in this case by means of a fitting comprising the member 57, which is threaded to the torch head and locked by means of the set screw 58, and a special coupling 59.

In this example, however, the outer member 50 is provided with an annular series of passageways 60 through which the heating gases may be projected to form an outer heating flame which may cooperate with the jet of cutting oxygen issuing from the annular port 54. The inner ends of the passageways 60 are arranged to communicate with the passageways 61 which in turn connect with the groove 62 in the inner face of the inner member 45. This groove 62 cooperates with the corresponding groove 63 in the adapter plate, which in turn is connected with the groove 64 on the opposite face of the plate. This groove 64 faces the groove 65 formed in the head of the torch and which is supplied with combustible gas through the passageway 66. Similarly oxygen may be supplied to the heating gas passageways 60 by means of the following: passageway 68 in the outer tip member 50; passageway 69 and groove 70 in the base flange of the inner member 45; groove 71, passageway 72, and groove 73 in the adapter plate; groove 74 and passageway 75 in the head of the torch.

The number of passageways or ports 60 may be varied as desired, but the ports should be arranged close enough to each other so that the heating gases when ignited will form a continuous elongated flame just as in the case of the inner heating flame described in connection with the first two embodiments. The number of passageways in the adapter plate connecting the grooves in the opposite faces thereof may be fewer than the number of passageways 60 in the tip if desired. Similarly the oxygen and combustible gas passageways 75 and 66 in the torch head leading to the grooves 74 and 65 may be fewer in number than the passageways beyond this point.

Suitable valve arrangements may be made, as well-known in the art, to control the inner oxygen and combustible gas supplies, the cutting oxygen supply, and the outer oxygen and combustible gas supplies in order to manipulate the torch in the desired manner. For example, the torch could be operated in exactly the same way as those illustrated in Figures 1 to 4 of the drawing, in which the heating flame is applied to the work from ports arranged interiorly of the cutting oxygen port; the outer series of ports 60 could be employed for projecting an elongated narrow heating flame against the work from a point exteriorly of the cutting oxygen jet; or two heating flames, an inner one and an outer one, could be projected against the work from both series of orifices or ports 46 and 60, thus preheating the work in an extremely effective manner for the application of the cutting oxygen.

It will be appreciated, of course, by one skilled in the art that the novel forms of tip above described need not be in all instances so designed as to cut a circular disk from a sheet or plate. For instance, the tip may be so designed that continuous or endless cuts of square, oblong, elliptical, or other shape may be made or a discontinuous or line cut of any desired configuration.

It will also be obvious that, within the scope of the invention, the mixing of the constituent gases of the preheating flame may take place in the body of the torch, thus eliminating certain of the passageways in the tip and adapter.

Having thus described the invention, what is claimed as new and desired to be secured by Letters Patent is:

1. A tip for a cutting torch designed and constructed for the cutting of blanks from metal plates or the like, comprising a body having a plurality of gas discharging means therein, two of said means being for the discharge therefrom of separate transversely endless narrow gaseous streams comprising heating flames, and another of said means for the discharge therefrom of a separate transversely endless narrow gaseous stream which is closely adjacent said first named streams and comprises a stream of cutting oxygen, the stream of cutting oxygen being directed to strike a narrow continuous strip of work previously heated by one or more of said heating flames, whereby a blank may be completely severed from a plate or the like with a minimum expenditure of gas and waste of metal.

2. A tip for a cutting torch comprising a body having a plurality of means for the discharge of heating gases forming when ignited narrow flames elongated in a direction transverse to the direction of discharge of said gases, and other means for the discharge of a narrow stream of cutting oxygen, substantially coextensive in length with said flames as measured in a plane transverse to the direction of gas flow, in such direction as to strike a highly heated long narrow section of work previously heated by one or more of said heating flames, whereby a long narrow slot may be cut in such work with a minimum expenditure of combustible gas and oxygen, and without moving the torch in any direction having a component parallel to the surface of the work.

3. A tip for a cutting torch comprising a body having means for the discharge of a narrow transversely elongated stream of cutting oxygen, and other means disposed one upon each side of said first named means for the discharge of heating gases forming when ignited a narrow transversely elongated flame on each side of said oxygen stream, all of said streams being substantially parallel and coextensive in length as measured in a plane transverse to the direction of gas flow, said stream of cutting oxygen being directed to strike a long narrow section of work previously heated by one or more of said heating flames, whereby a long narrow slot may be cut in such work with a minimum expenditure of combustible gas and oxygen and without moving the torch in any direction except perpendicular to the surface of the work.

4. A tip for a cutting torch designed and constructed for the cutting of blanks from metal plates and the like, comprising a body having means for the discharge therefrom of a transversely endless narrow gaseous stream comprising a heating flame, and additional means disposed exteriorly of said first named means for discharging therefrom a separate transversely endless narrow gaseous stream which is closely adjacent to and enveloping said first named stream and comprises a stream of cutting oxygen, the stream of cutting oxygen being directed to strike a narrow continuous strip of work previously heated by the heating flame, whereby a blank may be completely severed from a plate or the like with minimum expenditure of gas and waste of metal and without moving the torch in any direction parallel with the surface of the work.

5. A tip for a cutting torch comprising an inner member provided with an annular marginal series of ports for the discharge of a series of streams of heating gas which together form a narrow transversely elongated flame, an outer sleeve-like member surrounding said first named member and having its inner surface spaced from the outer surface of said inner member to define an annular passageway for the passage of a narrow stream of cutting oxygen closely adjacent the heating flame, and means for securing said members to the head of a torch, said outer member also being provided with an annular series of ports for the discharge of a series of streams of heating gas which together form a narrow transversely elongated flame closely adjacent said stream of cutting oxygen but disposed exteriorly thereof.

6. A tip for a cutting torch comprising an inner member provided with an annular marginal series of ports for the discharge of a series of streams of heating gas which together form a narrow transversely elongated flame, an outer sleeve-like member surrounding said first named member and having its inner surface spaced from the outer surface of said inner member to define an annular passageway for the passage of a narrow stream of cutting oxygen closely adjacent the heating flame, and means for securing said members to the head of a torch, the stream of cutting oxygen being directed to strike a narrow continuous strip of work previously heated by the heating flame, whereby a blank may be completely severed from a plate or the like with minimum expenditure of gas and waste of metal.

7. A tip for a cutting torch designed and constructed for cutting large openings in metal plates or the like, comprising a body having passageways and ports therein for discharging gases; certain of said passageways and ports arranged for the discharge therefrom of a tubular stream of heating gases forming when ignited a tubular heating flame of suitable cross sectional configuration; certain other of said passageways and ports arranged for the discharge of a separate stream of cutting gas which is also tubular, of the same cross sectional configuration, and having its periphery closely adjacent and parallel with that of the first named stream; the stream of cutting gas being directed to strike a narrow continuous strip of work heated by said heating flame; and the diameter of said tubular streams being of such magnitude that the material within the inner peripheries of said streams is not burned away; whereby said material may be completely severed from said plate or the like with a minimum expenditure of gas and waste of material and without moving said torch along the surface of the work.

8. A tip for a cutting torch designed and constructed for the cutting of blanks from metal plates and the like, comprising a body having means for the discharge therefrom of a tubular gaseous stream of the cross-sectional configuration desired comprising a heating flame, an additional means for discharging therefrom a separate tubular gaseous stream which is closely adjacent said first named stream and comprises a stream of cutting oxygen of similar cross sectional configuration, the stream of cutting oxygen being directed to strike a narrow continuous strip of work previously heated by the heating flame and the diameter of said tubular streams being of such magnitude that the material within the inner peripheries of said streams is not burned away, whereby said material may be completely severed from said plate or the like with a minimum expenditure of gas and waste of material; the heating gas discharge means comprising a series of closely spaced individual relatively small discharge ports equi-distantly spaced from a common point and the oxygen discharge means being annular and centered at said point.

ALEXANDER F. JENKINS.